US007346494B2

(12) United States Patent
Ando et al.

(10) Patent No.: US 7,346,494 B2
(45) Date of Patent: Mar. 18, 2008

(54) DOCUMENT SUMMARIZATION BASED ON TOPICALITY AND SPECIFICITY

(75) Inventors: Rie Ando, Tarrytown, NY (US); Branimir Konstantinov Boguraev, Bedford, NY (US); Roy Jefferson Byrd, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 10/699,375

(22) Filed: Oct. 31, 2003

(65) Prior Publication Data

US 2005/0096897 A1 May 5, 2005

(51) Int. Cl.
*G06F 17/27* (2006.01)
*G06F 17/30* (2006.01)
(52) U.S. Cl. ............................................... 704/9; 704/7
(58) Field of Classification Search ............... None
See application file for complete search history.

(56) References Cited

U.S. PATENT DOCUMENTS 6,865,572 B2* 3/2005 Boguraev et al. ............... 707/5
2002/0138528 A1* 9/2002 Gong et al. .................. 707/530

OTHER PUBLICATIONS

Fleischman et al. "Fine Grained Classification of Named Entities" Coling 2002.*
Goldstein et al. "Summarizing Text Documents: Sentence Selection and Evaluation Metrics" SIGIR 1999.*
Muresan et al. "Combining Linguistic and Machine Learning Techniques for Email Summarization" Proceedings of CoNII-2001, Toulouse, France.*
White et al. ("Multidocument Summarization via Information Extraction" In the proceedings of the First International Conference on Human Language Technology Research, 2001, San Diego, CA.*
Ando et al., "Iterative Residual Rescaling: An Analysis and Generalization of LSI," SIGIR, pp. 154-162 (2001).
Boguraev et al., "Discourse Segmentation in Aid of Document Summarization," Proc. OfHawaaii Inter'l Conf. On System Summaries (2000).
Deerwester et al., "Indexing by Latent Semantic Analysis," Journal of American Society for Information Science, vol. 41, No. 6, pp. 391-407 (1990).
Radev et al., "Generating Natural Language Summaries from Multiple On-Line Sources," Association for Computational linguistics (1998).

* cited by examiner

*Primary Examiner*—V. Paul Harper
(74) *Attorney, Agent, or Firm*—Ryan, Mason & Lewis, LLP

(57) ABSTRACT

Topicality scores are determined for a number of phrasal expressions in documents. Phrasal expressions may be noun phrases, with or without corresponding prepositional phrases, subject-verb pairs, and verb-object pairs. The documents describe some topic or multiple topics. Techniques can be used to determined how the phrasal expression compares with the topic or topics being described in the documents. Specificities are determined for the phrasal expressions. Techniques may be used to determine whether phrasal expressions are more or less specific than other phrasal expressions. An order is determined for the phrasal expressions by using the topicality scores and the specificities. The order may be represented as a phrasal expression tree, for example. The phrasal expression tree may be displayed to a user, and the user can navigate through the phrasal expression tree, and therefore through the one or more documents.

25 Claims, 5 Drawing Sheets

DOCUMENT SUMMARIZATION BASED ON TOPICALITY AND SPECIFICITY

FIELD OF THE INVENTION

The present invention relates to automated analysis of documents and, more particularly, relates to document summarization through automated analysis.

BACKGROUND OF THE INVENTION

Automated analysis has become a popular tool in order to categorize electronic documents (called "documents" herein). Typically, documents are analyzed through a variety of automated techniques, such as document clustering, summarization, and indexing. Such techniques are used to help people determine, respectively, similarities between documents, a synopsis of a document or documents, and a way of navigating through multiple documents.

In particular, summarization of multiple documents can be helpful, for example, when browsing through search results or when editing or exploring a taxonomy (e.g., a classification of items based on similarities between the items, such as a set of hierarchically-organized documents). For instance, home repair may be divided into a number of similar topics, such as repair of electrical systems, replacement of breakers, wiring new circuits, and replacing switches in preexisting circuits.

Some techniques for analysis of documents use phrasal expressions, typically comprising one or more words, during analysis. For example, "nuclear power" is a phrasal expression that might be of some value for a certain document. This phrasal expression could then be used to summarize the document, if, for instance, the phrasal expression occurs a predetermined number of times in the document. Additionally, if a collection of documents have the phrasal expression "nuclear power plant," then this phrasal expression can be used in a summary of the collection.

Although document analysis is beneficial to distill a summary or multiple summaries of a collection of documents, conventional document summarization techniques tend to become overburdened when there are a large number of miscellaneous documents in the collection being summarized. Additionally, the generated summaries may not make sense relative to a collection of documents. For instance, the phrasal expressions "nuclear power" and "nuclear proliferation" might appear in the collection enough to be used to summarize the collection, but a summarization of the collection may not indicate if the two phrasal expressions are related. Therefore, a person attempting to use the summarization to navigate the collection may not realize that the two phrasal expressions are or are not related in the collection.

Thus, there is a need to improve document summarization techniques.

SUMMARY OF THE INVENTION

Exemplary aspects of the present invention provide improved techniques for summarizing documents.

In an exemplary aspect of the invention, topicality scores are determined for a number of phrasal expressions in one or more documents. Phrasal expressions can be, for example, noun phrases, with or without corresponding prepositional phrases, subject-verb pairs, and verb-object pairs. In general, the one or more documents describe some topic or multiple topics. Techniques can be used to determine how the phrasal expression compares with the topic or topics being described in the one or more documents, and topicality scores can be assigned using the techniques. Additionally, specificities are determined for the phrasal expressions. Techniques may be used to determine whether phrasal expressions are more or less specific than other phrasal expressions. For example, the phrasal expression "nuclear power plant" may be considered to be more specific than the phrasal expression "power plant." An order is determined for the phrasal expressions by using the topicality scores and the specificities. The order may be used when summarizing the one or more documents The order may be represented as a phrasal expression tree, for example. The phrasal expression tree may be displayed to a user, and the user can navigate through the phrasal expression tree, and therefore through the one or more documents, in a simple, easily understood manner.

A more complete understanding of the present invention, as well as further features and advantages of the present invention, will be obtained by reference to the following detailed description and drawings.

DETAILED DESCRIPTION OF PREFERRED EMBODIMENTS

Figure 1:
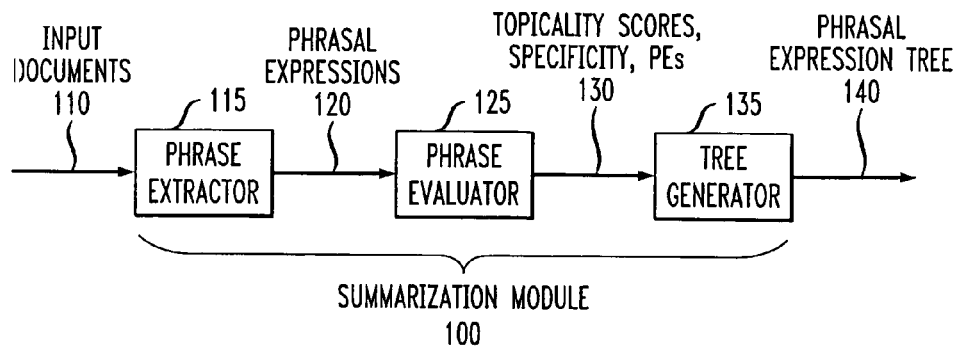
FIG. 1 is a block diagram of a summarization module in accordance with an exemplary embodiment of the present invention.

As described above, document summary has important benefits. For example, the rapid growth of electronic documents has created a great demand for techniques for automatically summarizing textual information. In particular, there are many occasions where summarization of multiple documents would be helpful, e.g., as described above, browsing search results and editing or exploring a taxonomy.

Existing technologies regarding taxonomy generation focus on the organization of documents by document clustering or categorization or both with less emphasis on the generation of taxonomy labels or summarization of the documents. Typically, the taxonomy labels are generated by choosing the words or metadata regarded as most discriminating during the process of taxonomy construction. See, e.g., U.S. Pat. No. 5,924,090, to Krellenstein, entitled "Method and Apparatus for Searching a Database of Records," the disclosure of which is hereby incorporated by reference. Such an approach typically produces a list of tokens (e.g., "attic, cool, window, soffit, hot"), which may be hard to comprehend or misleading due to the lack of context.

Existing multi-document summarization technologies focus on sentence extraction or generation. See, for instance, D. Radey and K. McKeown, "Generating Natural Language Summaries from Multiple On-Line Sources," Computational Linguistics, Vol 24, No 3, 469-500 (1998), the disclosure of which is hereby incorporated by reference. These technologies are intended for summarizing a relatively small number of documents (e.g., twenty documents) on a single topic, and are generally not applicable to larger sets of miscellaneous documents, as are often encountered in practice.

Exemplary embodiments of the present invention overcome these problems. In exemplary embodiments, techniques are presented that generate and present a summary of one or multiple documents in a form that enables interactive exploration through a graphical interface to a degree of specificity and topicality preferred by a user.

Given a set of documents written in a natural language (e.g., English), an exemplary embodiment of the present invention can generate a set of phrasal expressions organized into a phrasal expression tree based on the relationships, for instance, of the phrasal expressions to contents of a collection of documents and, as another example, mutual relationships among the phrasal expressions. That is, the phrasal expression tree may be formed, in an exemplary embodiment, so that (1) more centered (e.g., with respect to the collection) phrasal expressions can be seen first, (2) a child node is a more specific phrasal expression than a node corresponding to a parent of the child, and (3) mutually-related phrasal expressions are placed closely to each other.

An exemplary resultant tree, when displayed with expandable nodes, facilitates efficient user exploration from more general to more specific and from more centered to less centered concepts. Additionally, in another exemplary embodiment, the user can avoid the distraction of irrelevant information by collapsing sub-trees. The close proximity of mutually-related phrasal expressions effectively helps the user understand the overall concept space, even though each of the phrasal expressions may be terse and possibly ambiguous by itself. Moreover, another exemplary embodiment of the present invention can produce a list of phrasal expressions linearly ordered from more centered to less centered with respect to the entire document set. Furthermore, an additional exemplary embodiment of the present invention can group or cluster documents by associating each document with the phrasal expressions most closely related to the phrasal expression.

Exemplary embodiments of the present invention are useful for (but not restricted to) presenting a taxonomy, which is generally a set of hierarchically-organized documents. Another exemplary embodiment of the present invention can be used to assign succinct descriptions or labels to the taxonomy nodes by choosing the most centered phrasal expression for the set of documents associated with the node. In addition, a more detailed summary for each taxonomy node can be displayed in the form of the expandable tree described above, which helps the user reach her desired information.

Compared with existing technologies for automatic taxonomy generation, the present invention has an advantage of generating more comprehensible descriptions of taxonomy nodes. Moreover, unlike typical existing multi-document summarization techniques, exemplary embodiments of the present invention are applicable to a larger number of documents (e.g., several thousands of documents) and do not require a collection of documents to be on a single topic.

Referring now to FIG. 1, a block diagram of a summary module 100 is shown. Summary module 100 accepts input documents 110 and produces, in this example, a phrasal expression tree 140. Phrasal expression tree 140 is one way of ordering phrasal expressions. Summarization module 110 comprises phrase extractor process 115, phrase evaluator process 125, and tree generator process 135. Phrase extractor process 115 produces phrasal expressions 120 from the input documents 110. The phrase evaluator process 125 determines, in output 130, topicality scores and specificity. The phrase evaluator process 125 generally will, in output 130, provide the phrasal expressions so that the phrasal expressions are correlated with the topicality scores and specificities. The phrase evaluator process 125 may also provide additional phrase-phrase relationship scores (not shown but described below), if desired. The tree generator process 135 produces the phrasal expression tree 140 from the output 130.

Figure 2:
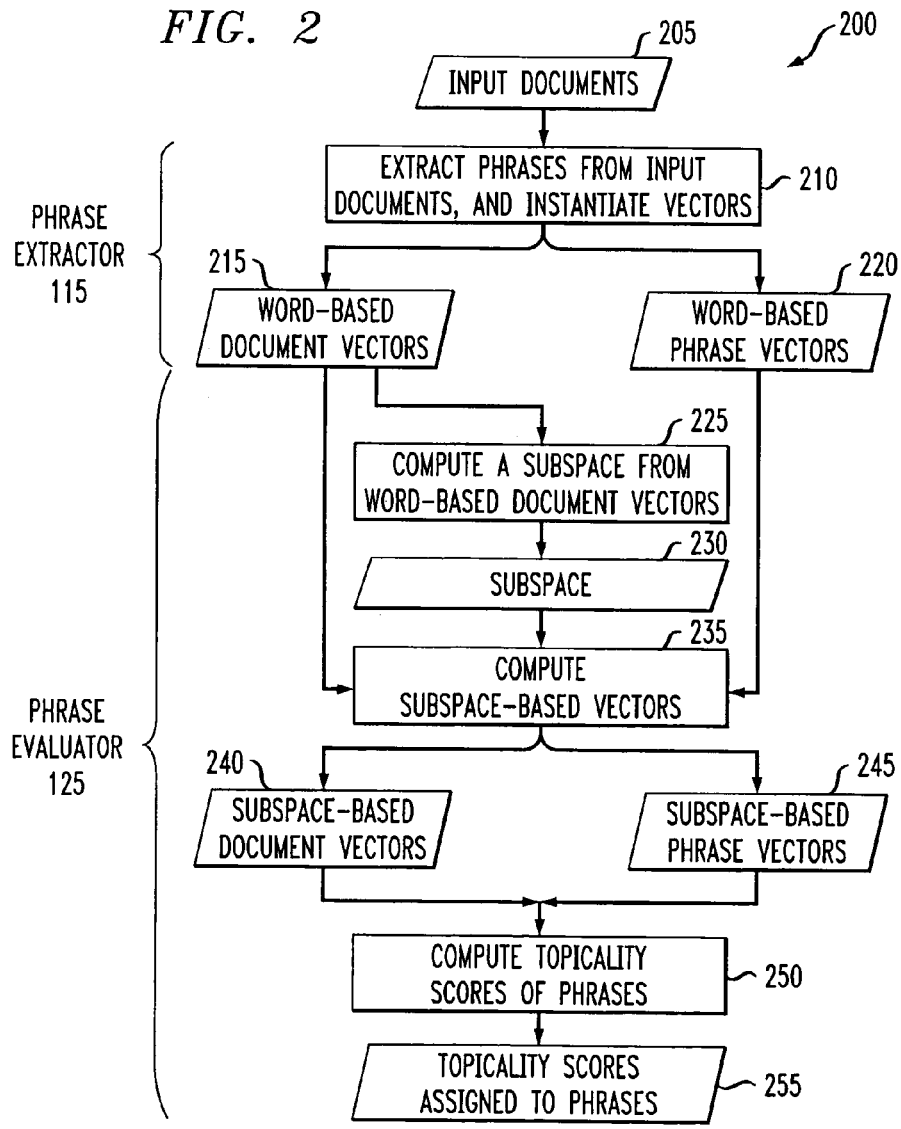
FIG. 2 is a flow chart of an exemplary method for determining topicality scores for phrasal expressions.
Figure 3:
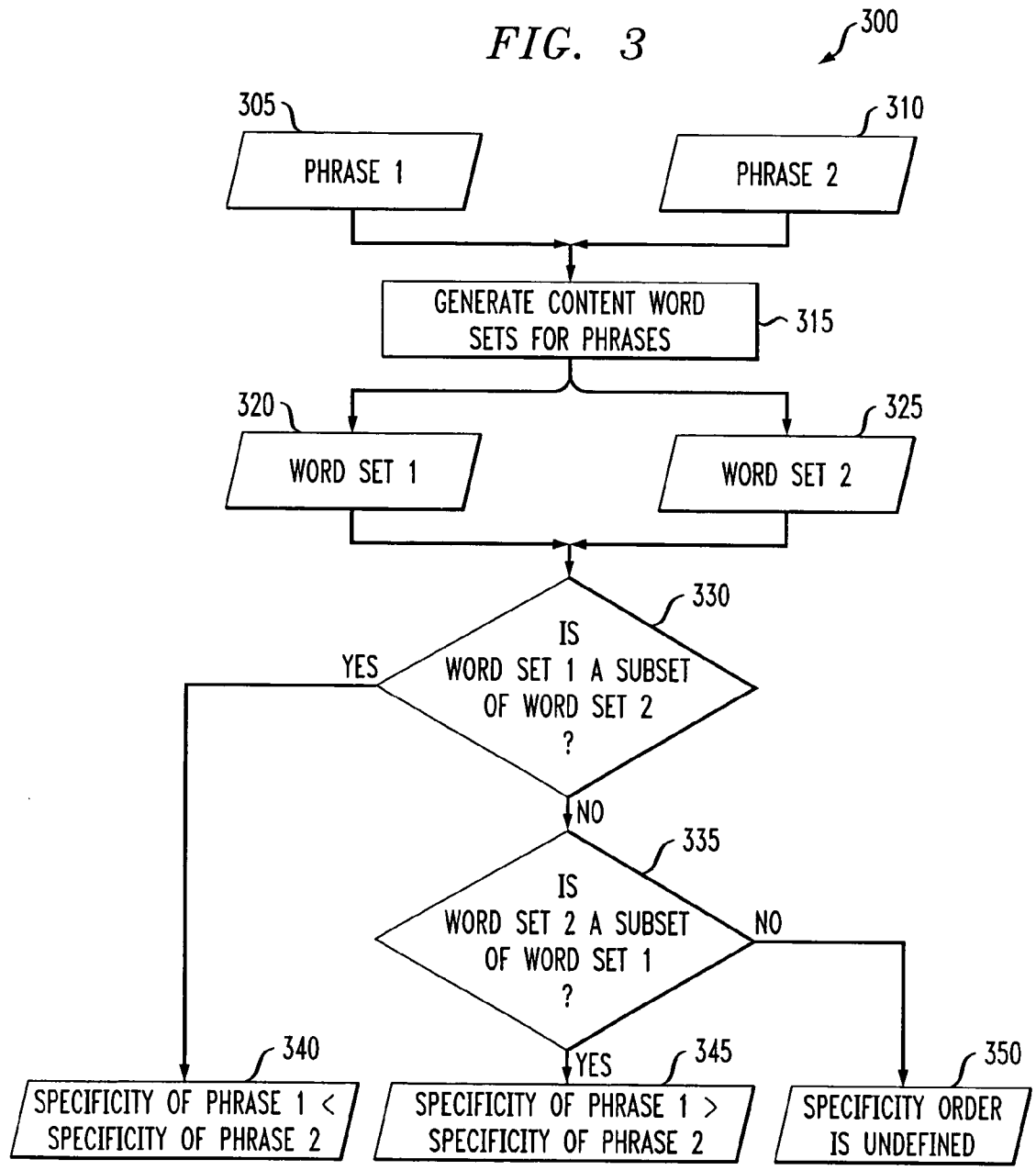
FIG. 3 is a flow chart of an exemplary method for determining specificity of phrasal expressions.
Figure 4:
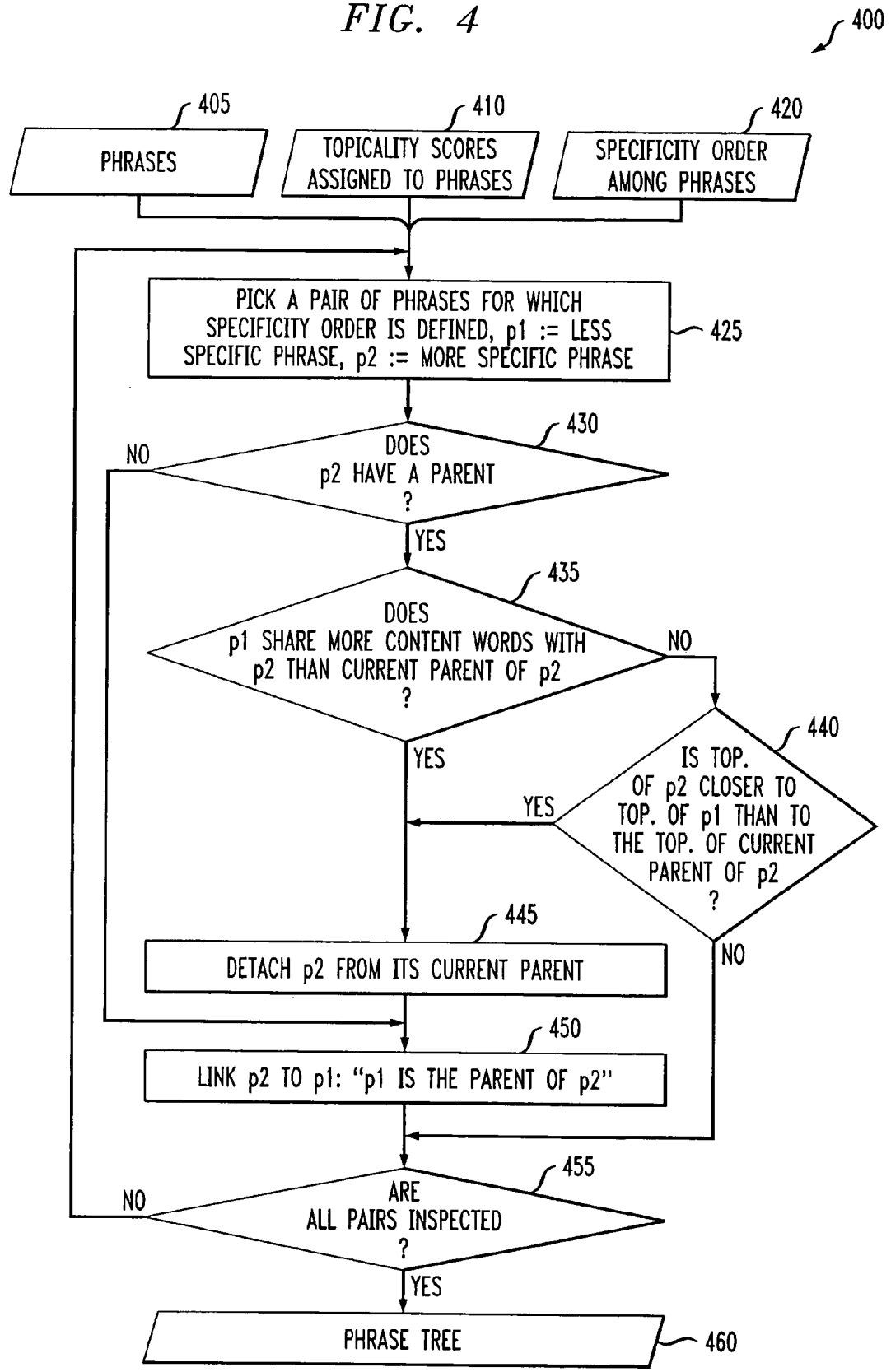
FIG. 4 is a flow chart of an exemplary method for determining a phrasal expression tree, which is an exemplary way of ordering phrasal expressions in accordance with an embodiment of the present invention.

FIGS. 2 through 4 show methods performed by the processes 115, 125, and 135. The method of FIG. 2 is performed by the phrase extractor process 115 and the phrase evaluator process 125. The method of FIG. 3 is performed by the phrase evaluator process 125. The method of FIG. 4 is performed by the tree generator process 135. It should be noted that the processes 115, 125, and 135 are exemplary only and steps performed by one process in the methods shown in FIGS. 2 through 4 can be performed by another process or even processes not shown in these figures, if desired.

Turning now to FIG. 2, a method 200 is shown for creating topicality scores from input documents. Method 200 (and the methods shown in FIGS. 3 and 4) show steps performed, input data used by the steps, and data output by the steps. In the example of FIG. 2, the phrase extractor process 115 uses the input documents 205 in step 210, and produces the output of phrasal expressions, which are word-based document vectors 215 and word-based phrase vectors 220. The phrase evaluator process 125 uses the vectors 215 and 220, performs steps 225, 235, and 250, and produces topicality scores 255 assigned to phrases 255.

The phrase extractor process 115, in step 210 of method 200, extracts phrasal expressions from the input documents. The extracted phrasal expressions are typically sensible single-word or multi-word expressions such as noun phrases, with or without prepositional phrases, and subject-verb or verb-object pairs. An exemplary embodiment of the phrase extractor process 115 is a linguistically-motivated shallow parser such as that described in, for example, B. Boguraev and M. Neff, "Discourse Segmentation in Aid of Document Summarization," in Proc. of Hawaii Int'l Conf. on System Sciences, Minitrack on Digital Documents Understanding (2000), the disclosure of which is hereby incorporated by reference.

Conventional frequency-based techniques such as weighted term frequency (tf-idf) are typically not suitable for embodying the phrase extractor process 115, as these frequency-based techniques suffer from a strong bias towards single-word phrasal expressions. This is because, statistically, multi-word phrasal expressions tend to occur less than single-word phrasal expressions and, thus, receive lower scores, regardless of their true topicality.

A preferred, but non-limiting, implementation of the phrase extractor process 115 is as follows. Instead of counting the occurrences of phrasal expressions, the phrasal expressions are evaluated based on the occurrences of their constituent tokens in the input documents 110, where a token is a content word. A token-document matrix, whose [i,j]-element is the occurrence frequency of the ith token in the jth document, is generated, and the columns of this matrix are called document vectors 215. Similarly, a token-phrase matrix, whose [i,j]-element is the occurrence frequency of the ith token in the jth phrasal expression, is generated, and the columns of this matrix are called phrase vectors 220. A conventional tern-weighting scheme and length-normalizing are applied to the columns of the matrices 215, 220.

It should be noted that step 210 produces both phrasal expressions and vectors 215, 220. For example, if the sentence "Nuclear weapons are dangerous" is considered to be a document, then a phrasal expression might be "nuclear weapons." A word-based phrase vector 220 might be [0,0,1,1], indicating there are zero instances of "are," zero instances of "dangerous," one instance of "nuclear" and one instance of "weapons." A word-based document vector might be [1,1,1,1], indicating there is instance of "are," one instance of "dangerous," one instance of "nuclear" and one instance of "weapons."

The phrase evaluator process 125 assigns a topicality score 255 of each of the extracted phrasal expressions 220 with respect to the collection of input documents 205. The topicality score 255 for a phrasal expression 220 is a degree to which the phrasal expression 220 represents the topics discussed in the input documents 115. For example, a phrasal expression 220 can receive a larger topicality score when it is more closely related to the topics discussed in more documents. A preferred, but non-limiting, implementation of the phrase evaluator process 125 is as follows.

In step 225, a subspace 230 of a column space of the token-document matrix is determined by applying the Iterative Residual Rescaling (IRR) technique. This technique is described in R. Ando and L. Lee, "Iterative Residual Rescaling: An Analysis and Generalization of LSI," in Proc. of Special Interest Group on Information Retrieval (SIGIR) (2001). In step 235, the subspace 230, the word-based document vectors 215 and the word-based phrase vectors 220 are used to compute subspace-based vectors. The subspace-based vectors are the subspace-based document vectors 240 and the subspace-based phrase vectors 245. The associations between documents and phrasal expressions are measured by computing inner products between corresponding subspace-based document vectors 240 and the subspace-based phrase vectors 245. These associations are called topicality scores 255 and are determined for phrasal expressions in step 250. The topicality score may be defined as the square sum of the inner products between the projected phrase vector and all the projected document vectors:

$$\text{top}(P_i) = \sum_{j}^{|d \in C|} (P_i^T d_j)^2,$$

where $P_i$ is a phrase vector, $d_j$ is the jth document vector, and there is a collection, C, of documents.

The IRR technique is a generalization of Latent Semantic Indexing (LSI), described in S. Deerwester, S. Dumais, G. Fumas, T. Landauer, and R. Harshman, "Indexing by Latent Semantic Analysis," Journal of the American Society for Info., 41(6) (1990), the disclosure of which is hereby incorporated by reference. R. Ando and L. Lee, "Iterative Residual Rescaling: An Analysis and Generalization of LSI," already incorporated by reference above, has shown that IRR gives a better document similarity measurement than either LSI or a conventional usage of the vector space model, especially when the distributions of underlying topics over documents are nonuniform. Nonetheless, techniques such as LSI may be used when determining topicality, if desired. Subspace projection-based methods such as LSI and IRR provide similarity measurements among text units, which take the statistics of word co-occurrences into account. This produces a smoothing effect.

The phrase evaluator process 125 may also measure phrase-phrase relations (not shown in FIG. 2), which are the degree of relatedness of one expression to another. A pair of expressions has a stronger relation when they are related to similar topics. Using the IRR-based implementation above, a phrase-phrase relation can be measured by the inner product between corresponding phrase vectors after projecting them onto the subspace. Thus, inner products between the subspace-based phrase vectors 245 may be determined to measure phrase-phrase relations, which can result in phrase-phrase relations scores.

Referring now to FIG. 3, a method 300 is shown to determine specificity for phrasal expressions. Method 300 is generally performed by the phrase evaluator process 125 of FIG. 1. Specificity indicates a partial order among phrasal expressions. There are different techniques that might be used to determine specificity. For example, one way to define specificity is to use set inclusion of constituent tokens. For instance, "water" < "water damage," and the order of "water damage" and "tub water" is undefined. Alternatively, the specificity can be defined by an ontological relation such as the "is-a" relation, e.g., "furniture" < "sofa", when an appropriate ontology is available. Method 300 uses set inclusion, but ontological relations may be used in place of or in addition to the set inclusion.

Method 300 begins in step 315, where phrasal expression 305 and phrasal expression 310 are used to determine content word sets 320 and 325. A phrasal expression 305 might be "nuclear weapon." Word set 320 might then be {nuclear, weapon}. A difference between phrasal expression 305 and word set 320 is that the word order matters in phrasal expression 305 (e.g., "nuclear weapon" and "weapon nuclear" are different phrasal expressions), while the word order does not matter in phrasal expression 320, i.e., sets {nuclear, weapon} and {weapon, nuclear} are equivalent.

In step 330, it is determined if the word set 320 is a subset of the word set 325. If the word set 320 is a subset of the word set 325 (step 330=Yes), then the specificity of phrasal expression 305 is assumed to be less than the specificity of phrasal expression 310. If the word set 320 is not a subset of the word set 325 (step 330=No), then step 335 is performed. In step 335, it is determined if the word set 325 is a subset of the word set 320. If so (step 335=Yes), the specificity of phrasal expression 305 is assumed to be greater than the specificity of phrasal expression 310. If not (step 335=No), the specificity order between the phrasal expressions 305, 310 is undefined.

It should be noted that specificity is typically defined for a pair of phrasal expressions. Method 300 will generally be performed for each pair of phrasal expressions. Therefore, if there are three phrasal expressions A, B, and C, a specificity will be defined for pairs A-B, A-C, and B-C. In an exemplary embodiment, specificity will be assigned as "<", ">", or "undefined." Specificity may also indicated by references, such as, in step 340, having phrasal expression 305 reference phrasal expression 310 or vice versa. The specificity references may be used to create a specificity order, which is then used in the method of FIG. 4. Thus, if phrasal expression A references phrasal expression B and has an associated specificity of "<", then phrasal expression A is, for instance, assumed to be less specific than phrasal expression B.

The tree generator process 135 performs the method 400 shown in FIG. 4. The tree generator process 135 organizes the phrasal expressions 405 into an order based on the topicality scores 410, the specificity order 420, and, if determined, the phrase-phrase relations (not shown) of the phrasal expressions. The order in the example of FIG. 4 is represented by a phrasal tree structure 460. A phrasal tree structure 460 may be formed by assigning, whenever possible, a parent to each phrasal expression 405 so that the parent is less specific. When there are multiple parent candidates, the phrasal expression 405 having the highest phrase-phrase relation (if calculated) may be used to determine to the child. Thus, mutually-related phrasal expressions may be placed close to one another. The siblings are typically, but not necessarily, ordered in descending order of the topicality scores, so that more centered expressions can be seen first when the resultant phrasal tree structure is displayed. Optionally, the phrasal tree structure may be pruned by removing siblings beyond a certain number at the top of each "layer," in order to save screen space.

In FIG. 4, the phrasal expressions 405, topicality scores 410 thereof, and specificity order 420 is used in step 425. In this step, a pair of phrasal expressions 405 are chosen for which the specificity order 425 is defined. In the example of FIG. 4, these phrasal expressions are assigned the names "p1" and "p2," where the specificity of p1 is less than the specificity of p2. Initially, there are no parent-sibling relationships defined. Parent-sibling relationships are defined through steps 430 to 455. In step 430, it is determined if p2 has a parent. If not (step 430 =No), then p2 is linked to p1 by making p1 the parent of p2. This occurs in step 450.

If so (step 430=Yes), then step 435 is performed. In step 435, it is determined if p1 shares more content words with p2 than p1 shares with the parent of p2. If so (step 435=Yes), then p2 is detached from its parent (step 445), and p1 is made the parent of p2 (step 450). If not (step 435=No), step 440 is performed.

In step 440, it is determined if the topicality of p2 is closer to the topicality of p1 than to the topicality of the current parent of p2. Topicality scores may be used for this step. If so (step 440=Yes), then p2 is detached from its current parent (step 445), and p1 is made the parent of p2 (step 450). If not (step 440=No), method 400 continues in step 455.

In step 455, it is determined if all pairs have been inspected. If not (step 455=No), then method 400 continues in step 425. If so (step 455=Yes), then the phrasal expression tree 460 has been created.

The phrasal expression tree 460 can be implemented through such techniques as a linked list or a doubly linked list.

Additionally, the tree generator process 135 can partition or cluster documents by associating each document with the phrasal expressions most closely related to the document. Using the IRR-based implementation above, the relatedness between documents and phrasal expressions can be measured by the inner products between corresponding projected vectors. The relatedness can then be assigned values, which can be used to order the phrasal expressions so that the phrasal expressions are near the documents to which the phrasal expressions are related.

Figure 5:
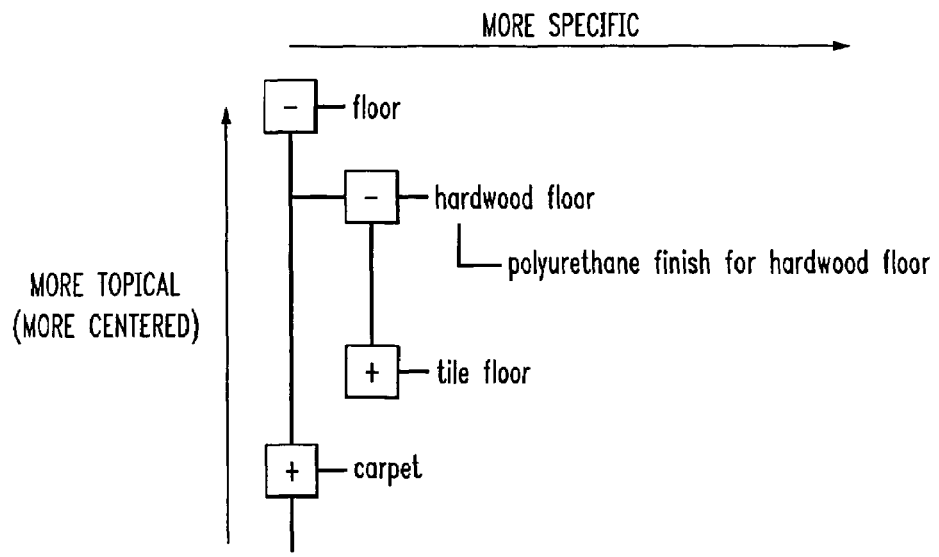
FIG. 5 is an exemplary phrasal expression tree.

Turning now to FIG. 5, an exemplary phrasal expression tree is shown. In this example, a "−" means that a node is expanded (e.g., can be contracted), while a "+" means that a node can be expanded. The node corresponding to the phrasal expression "floor" is expanded to include the phrasal expressions "hardwood floor" and "tile floor." The node corresponding to the phrasal expression "hardwood floor" is expanded to include the phrasal expression "polyurethane finish for hardwood floor." The node corresponding to the latter cannot be expanded or contracted. The nodes corresponding to the phrasal expressions "tile floor" and "carpet" can be expanded.

The phrasal expression tree shown in FIG. 5 has been ordered so that more topical phrasal expressions are near the upper part of the phrasal expression tree (i.e., toward "floor"), while less specific phrasal expressions are near the left (i.e., near "floor" and "carpet").

Figure 6:
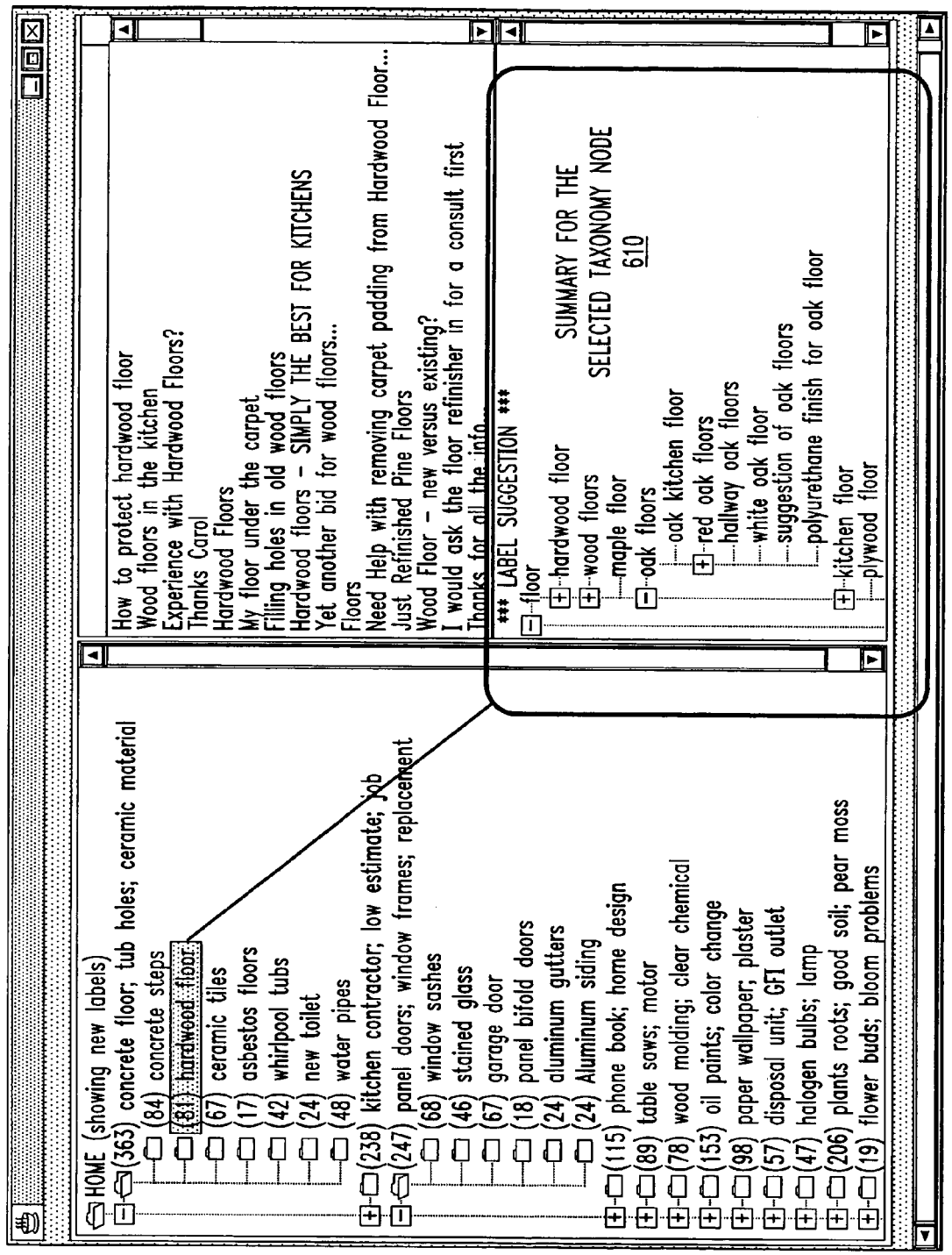
FIG. 6 is another exemplary phrasal expression tree.

Referring now to FIG. 6, another phrasal expression tree is shown. The summary 610 is a summary of the node corresponding to the phrasal expression "hardwood floor," and includes an expanded node corresponding to the phrasal expression "floor." The summary 610 uses a similar ordering system as that used in FIG. 5, so that the more topical phrasal expressions are placed near "floor" and more specific phrasal expressions are placed away from "floor."

Figure 7:
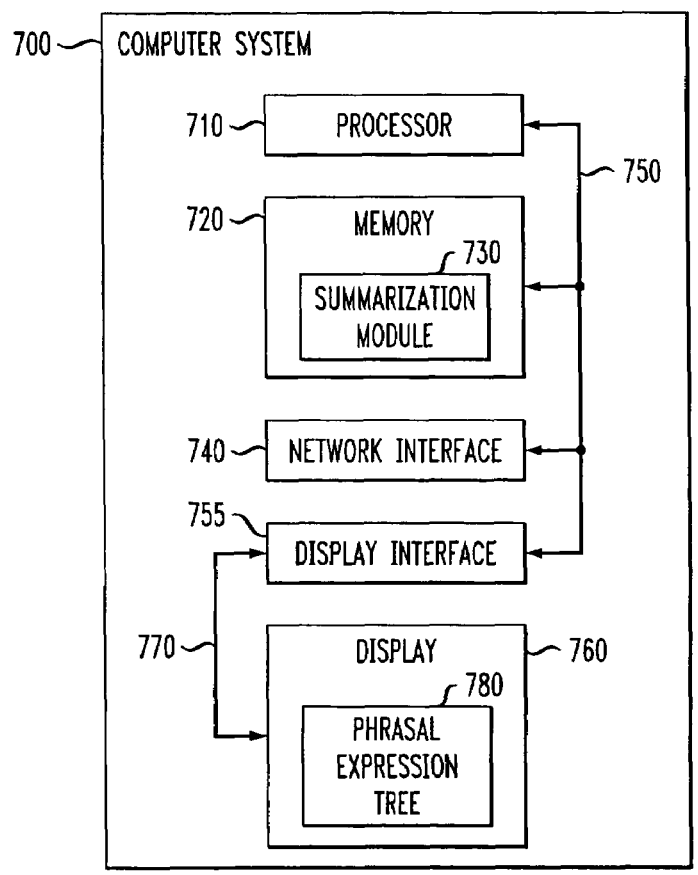
FIG. 7 is an exemplary computer system suitable for implementing embodiments of the present invention.

Turning now to FIG. 7, a computer system 700 is shown that is suitable for implementing embodiments of the present invention. Computer system 700 comprises a processor 710, a memory 720, a network interface 740, a display interface 755, and a display 760. In this example, the display 760 is part of computer system 700, but may also be separate from computer system 700. Memory 720 comprises summarization module 730, such as summary module 100 of FIG. 1. The display 760 is showing a phrasal expression tree 780 produced by the summarization module 730.

The processor 710 and memory 720 can be singular or distributed. Portions of the summarization module 730 will be loaded into processor 710 for execution. The portions of the summarization module 730 will, when loaded into processor 710, configure the processor to perform steps to undertake some part of the present invention. Network interface 740 can be used to connect to a network (not shown) and is optional. Display interface 755 is used to provide information to the display 760 in a form the display 760 can use. Phrasal expression tree 780 can be a phrasal expression tree such as those shown in FIGS. 5 and 6.

The present invention described herein may be implemented as an article of manufacture comprising a machine-readable medium, as part of memory 720 for example, containing one or more programs that when executed implement embodiments of the present invention. For instance, the machine-readable medium may contain a program configured to perform steps in order to perform methods 200, 300, and 400, described above. The machine-readable medium may be, for instance, a recordable medium such as a hard drive, an optical or magnetic disk, an electronic memory, or other storage device.

It is to be understood that the embodiments and variations shown and described herein are merely illustrative of the principles of this invention and that various modifications may be implemented by those skilled in the art without departing from the scope and spirit of the invention.

What is claimed is:

1. A method used when summarizing one or more documents, the method comprising the steps of:
   determining topicality scores for a plurality of phrasal expressions in the one or more documents;
   determining specificities for the plurality of phrasal expressions; and
   determining, by using the topicality scores and specificities, an order for the plurality of phrasal expressions, whereby the order may be used when summarizing the one or more documents.

2. The method of claim 1, wherein the one or more documents are from a collection of documents.

3. The method of claim 1, further comprising the step of determining phrase-phrase relations between given pairs of the phrasal expressions, and wherein the step of determining, by using the topicality scores and specificities, an order for the plurality of phrasal expressions further comprises the step of determining, by using the topicality scores, specificities and phrase-phrase relations, an order for the plurality of phrasal expressions.

4. The method of claim 1, wherein given ones of the plurality of phrasal expressions comprise one or more of following: noun phrases, noun phrases with corresponding prepositional phrases, subject-verb pairs and verb-object pairs.

5. The method of claim 1, further comprising the step of determining the phrasal expressions from the one or more documents.

6. The method of claim 1, wherein the step of determining topicality scores further comprises the steps of:
determining one or more document vectors from the one or more documents;
determining one or more phrase vectors from the one or more phrasal expressions;
using the one or more document vectors to determine a subspace;
using the subspace to determine one or more subspace-based document vectors from the one or more document vectors;
using the subspace to determine one or more subspace-based phrase vectors from the one or more phrase vectors; and
computing topicality scores by using the one or more subspace-based document vectors and the one or more subspace-based phrase vectors.

7. The method of claim 1, wherein the step of determining specificities for the plurality of phrasal expressions further comprises the step of:
determining a specificity for each pair of phrasal expressions in the plurality of phrasal expressions.

8. The method of claim 7, wherein each specificity indicates an order between a pair of phrasal expressions in the plurality of phrasal expressions.

9. The method of claim 7, wherein the step of determining specificity for each pair of phrasal expressions in the plurality of phrasal expressions further comprises the step of:
determining specificity for each pair of phrasal expressions in the plurality of phrasal expressions by using one or more of the following: set inclusion and an ontology.

10. The method of claim 7, wherein each specificity, for a pair of phrasal expressions, indicates whether a first phrasal expression in the pair is more specific than a second phrasal expression in the pair, whether the first phrasal expression in the pair is less specific than the second phrasal expression in the pair, or whether specificity is undefined for the first and second phrasal expressions.

11. The method of claim 7, wherein the step of determining specificity for each pair of phrasal expressions in the plurality of phrasal expressions further comprises the steps of:
generating two content word sets from a given pair of phrasal expressions;
using the content word sets to determine specificity corresponding to the given pair of phrasal expressions.

12. The method of claim 7, wherein the specificity for a given pair of phrasal expressions indicates a specificity order between the phrasal expressions in the given pair.

13. The method of claim 1, wherein the step of determining the order further comprises determining, by using the topicality scores and specificities, one or more parent-sibling relationships between the plurality of phrasal expressions.

14. The method of claim 13, wherein the step of determining an order for the plurality of phrasal expressions further comprises the steps of:
using the parent-sibling relationships to determine a phrasal expression tree; and
displaying a representation of the phrasal expression tree.

15. The method of claim 14, wherein the representation of the phrasal expression tree comprises a number of nodes, each node corresponding to a phrasal expression.

16. The method of claim 15, wherein a portion of the nodes are parent nodes and connect to sibling nodes, and wherein the step of displaying a representation of the phrasal expression tree further comprises the steps of:
expanding a parent node when the parent node is accessed and the parent node is contracted; and
contracted a parent node when the parent node is accessed and the parent node is expanded.

17. The method of claim 13, wherein a specificity is defined or undefined for pairs of phrasal expressions, wherein the step of determining one or more parent-sibling relationships further comprises the step of:
selecting a pair of phrasal expressions having a defined specificity;
determining if a selected one of the phrasal expressions in the selected pair has a parent assigned to the selected phrasal expression;
assigning the other phrasal expression in the pair to be the parent of the selected phrasal expression when the selected phrasal expression does not have a parent assigned to the selected phrasal expression;
when the selected phrasal expression does have a parent assigned to the selected phrasal expression, determining whether the other of the phrasal expressions in the selected pair should be assigned as the parent of the selected phrasal expression based on one or more of the following: content words for each of the phrasal expressions in the selected pair and topicality for each of the phrasal expressions in the selected pair.

18. An apparatus used when summarizing one or more documents, the apparatus comprising:
one or more memories; and
one or more processors coupled to the one or more memories, the one or more processors configured:
to determine topicality scores for a plurality of phrasal expressions in the one or more documents;
to determine specificities for the plurality of phrasal expressions; and
to determine, by using the topicality scores and specificities, an order for the plurality of phrasal expressions, whereby the order may be used when summarizing the one or more documents.

19. The apparatus of claim 18, wherein the one or more documents are from a collection of documents.

20. The apparatus of claim 18, wherein the one or more processors are further configured to determine phrase-phrase relations between given pairs of the phrasal expressions, and wherein the one or more processors are further configured, when determining an order for the plurality of phrasal expressions, to determine, by using the topicality scores, specificities and phrase-phrase relations, an order for the plurality of phrasal expressions.

21. The apparatus of claim 18, wherein given ones of the plurality of phrasal expressions comprise one or more of following: noun phrases, noun phrases with corresponding prepositional phrases, subject-verb pairs and verb-object pairs.

22. The apparatus of claim 18, wherein the one or more processors are further configured to determine the phrasal expressions from the one or more documents.

23. The apparatus of claim 18, wherein the one or more processors are further configured, when determining topicality scores:
to determine one or more document vectors from the one or more documents;
to determine one or more phrase vectors from the one or more phrasal expressions;
to use the one or more document vectors to determine a subspace;
to use the subspace to determine one or more subspace-based document vectors from the one or more document vectors;
to use the subspace to determine one or more subspace-based phrase vectors from the one or more phrase vectors; and
to compute topicality scores by using the one or more subspace-based document vectors and the one or more subspace-based phrase vectors.

24. The apparatus of claim 18, wherein the one or more processors are further configured, when determining the order, to determine, by using the topicality scores and specificities, one or more parent-sibling relationships between the plurality of phrasal expressions.

25. An article of manufacture for use when summarizing one or more documents, the article of manufacture comprising:
a computer readable medium containing one or more programs which when executed implement the steps of:
determining topicality scores for a plurality of phrasal expressions in the one or more documents;
determining specificities for the plurality of phrasal expressions; and
determining, by using the topicality scores and specificities, an order for the plurality of phrasal expressions,
whereby the order may be used when summarizing the one or more documents.

* * * * *